April 28, 1959     H. E. ENGLESON ET AL     2,884,117
BUCKET CONVEYER
Filed Dec. 24, 1954
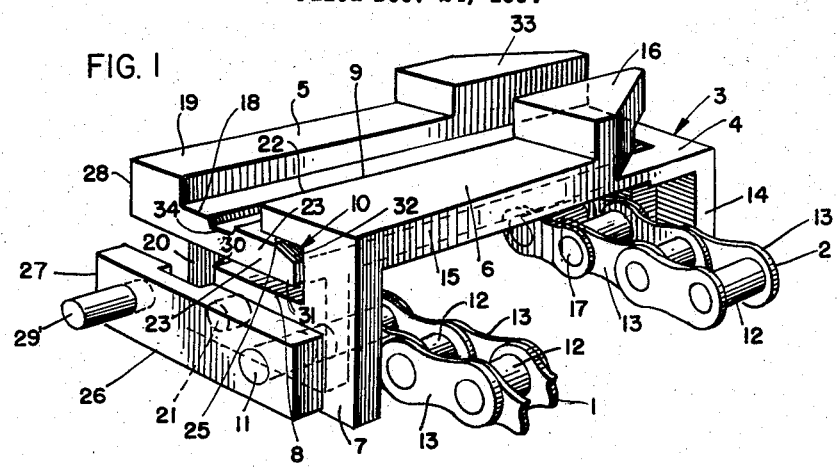
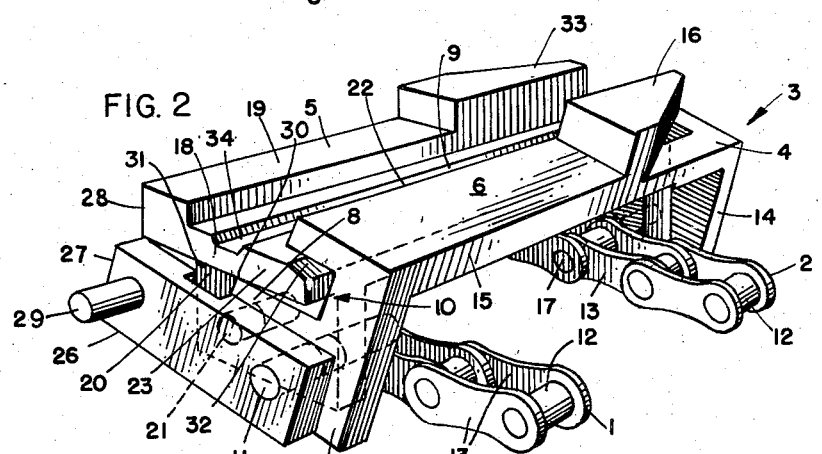
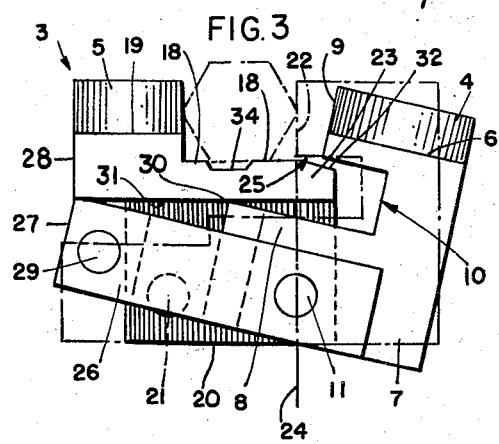
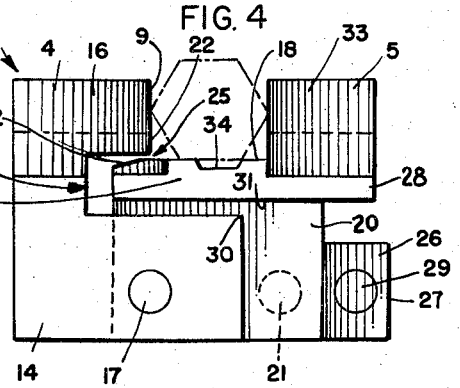
*INVENTOR.*
HARRY E. ENGLESON
STEPHEN V. KLEIN
BY *Marshall, Johnston, Cook & Root.*
ATT'YS :::page-header
United States Patent Office
2,884,117
Patented Apr. 28, 1959
:::

2,884,117

BUCKET CONVEYER

Harry E. Engleson, Chicago, and Stephen V. Klein, Evanston, Ill., assignors to F. B. Redington Co., Chicago, Ill., a corporation of Delaware Application December 24, 1954, Serial No. 477,484

3 Claims. (Cl. 198—179)

This invention relates to an endless conveyer of the type embodying a plurality of hingedly connected buckets.

The invention, as specifically shown and described herein, comprises in general a plurality of hingedly connected buckets, each adapted to receive at least one article of any kind capable of being conveyed in a bucket for later transfer or insertion into a container or other carton, the buckets arriving successively at a particular or predetermined loading and then to discharging position. Each bucket is constructed in a particular manner, and has a movable side wall so that an article or articles may be inserted easily therein when one section of a bucket is moved to its open position, being held in place in the bucket when the movable end wall is moved to its closed position. The cooperating parts of the bucket are such that a relatively large article or a relatively thin, small member, or both may be received in a bucket and prevented from shifting or from slipping through the bucket parts during transportation of the article and its accompanying thin, small washer or washer-like member. The adjacently located buckets are connected at their opposite ends by pins passing through the rollers of oppositely positioned chains of the roller type. The chains, to which the buckets are connected, form an endless conveyer which is driven by a sprocket engaging the rollers between the connecting links of the chains. The adjustable movable end wall of each bucket is so constructed and arranged that there will be no interference from adjacent buckets, or with the operation of the opposed chains. The movable section of each bucket is pivotally mounted on the opposed chains and to another part of the bucket in such a manner that the pivotal connection lies in a straight vertical line with respect to a clamping side of the movable section so as to keep the bottom of the movable section in close proximity to the supporting base of another section.

An important object of the present invention is to provide a new and improved conveyer structure made up of a plurality of hingedly connected buckets which are connected at their adjacent ends by opposed endless roller chains, there being an adjustable side wall for each bucket so as to receive and hold articles and then release or shift a part of the bucket to permit articles in the respective buckets to be discharged therefrom for later insertion into cartons.

Another object of the invention consists in the provision of an improved endless conveyor made up of a plurality of buckets each having a movable side wall which is pivotally connected to a cooperating section and to opposed roller chains, each bucket being provided with novel means to maintain a surface of each movable section in close proximity with the upper surface of an article supporting base.

A further object consists in a new and novel arrangement, construction and location of parts to provide a strong and durable bucket conveyer; at least one side wall of each bucket being adjustably movable so as to accommodate different kinds, types and sizes of articles, and to accommodate and locate articles in proper position within each bucket.

Another and very important object of the invention consists in arranging the pivotal connection of a movable part of a bucket in direct line with its inner clamping end so that the opening between the bottom ledge of the movable part will always lie close to the upper surface of the other part so that small articles, or parts therefor, cannot slip or fall out of the bucket sides or bottom.

Still another object is the provision of novel means for securing one section of a bucket to two points on its opposite ends to each chain, and the pivotal connection of another part or section to the oppositely disposed chains and to its other cooperating section to hold the buckets properly, to permit for free and easy movability of the buckets so as to operate freely but securely, prevent side and longitudinal displacement, and still allow for flexibility of operation.

Numerous other objects and advantages will be apparent throughout the progress of the specification which is to follow.

The accompanying drawing illustrates a selected embodiment of the invention, and the views therein are as follows:

Fig. 1 is a detail perspective view of a conveyer embodying the present invention, and showing the manner in which the two part bucket is mounted on opposed roller chains, the bucket being shown in closed position;

Fig. 2 is a view similar to Fig. 1 but showing the bucket in open position;

Fig. 3 is a detail end elevational view of one end of a bucket, and

Fig. 4 is a detail end elevational view of the other end of a bucket.

The particular construction herein shown for the purpose of illustrating the present invention comprises a pair of spaced roller chains 1 and 2 to which adjacently arranged article receiving and supporting structures 3, normally referred to in the packaging art as "buckets," are supported. Therefore, the conveyer embodying the chains 1 and 2, and the connected buckets 3 are normally referred to as a "bucket conveyer." The buckets 3 are located adjacent to each other and form a continuous line of contiguous buckets to receive products therein or thereon. The chains 1 and 2 are of the endless roller type, being driven by sprockets (not shown), in the usual conventional manner.

Each bucket 3 comprises two parts or sections 4 and 5, the part or section 4 being a movable part comprising a top piece or member 6 which extends across the opposed chains 1 and 2, and over the upper outer surface of the top ledge of the section 5. The bucket section or part 4 includes a downwardly extending relatively L-shaped integral member or leg 7 on one side with an inwardly extending lower horizontal leg 8 which extends inwardly beyond the inner end 9 of the top 6. The top 6, which extends over a part of the leg 8, forms a relatively U-shaped or channel-shaped opening or pocket 10 into which the inner end of the bucket part 5 extends.

The leg part 8 of the member 7 is pivotally mounted on a pin 11 which passes through a chain roller 12, the rollers 12 being connected together by spaced connecting links 13, 13 of the chain 1. The pin 11 acts as a pivot connection between the adjacent links of the chain 1, and is elongated, extending outwardly a sufficient distance to pivotally mount the part 8 of the member 7 of each bucket to the conveyer chain 1.

The bucket section 4 also includes a downwardly extending L-shaped integral member 14 which member lies directly opposite the leg 7, being substantially the same in configuration as the member 7. The leg 14 and the leg 7 form the pocket 10 so as to permit free operation of the part 4 with respect to the section or part 5. The top 6 of the section 4 is relatively narrow throughout its length and breadth as indicated at 15, but has an enlarged wedge-shaped part 16 which is integral with the top member 6. The L-shaped member 14, like the end L-shaped member 7, is also provided with a hole or opening which receives an elongated pin 17. The pin 17 like the pin 11 passes through a roller 12 on the chain 2, so as to pivotally mount that side of the bucket to the chain 2. The relatively L-shaped sides 7 and 14, with the top 6 overhanging a part thereof, are therefore pivotally mounted on the chains 1 and 2, respectively.

The other section 5 of each bucket 3 is provided with a top article supporting base section 18 which is of a predetermined thickness and includes an integral thickened part in the form of a ridge or bar 19 to provide an end wall for the bucket section 5. The top base section 18 of the bucket section 5 has a leg 20 on each side thereof which is integral with the top 18 and hangs downwardly from the bottom of the top base or supporting section 18. The elongated pins 11 and 17 are of sufficient length for pivotal engagement with the legs 20, 20 of the section 5, and pivotally connect the part or section 4 with the section 5. This arrangement permits the bucket part 4 to be movable toward and away from the bucket part 5. It also allows the buckets 3 to be driven by the endless chains 1 and 2 in an orbital path, and at the same time permit the part 4 of the buckets 3 to be shifted with respect to the bucket part or section 5.

An important feature of the invention consists in the manner in which the part 4 is pivotally mounted with respect to the part 5. The pivot formed by the pivot pins 11 and 17, pivotally connecting the bucket sections 4 and 5, is such that the inner or holding edge 22 of the top part 6 of the bucket section 4 will be directly in a straight vertical line when the section 4 is in its closed position, Figs. 1 and 4.

The bucket section 5 has its forward end 23 of the support part 18, positioned in the opening or slot 10, and beneath the inner clamping side 22 of the top 6 of the bucket section 4. The center of the pivot of the pins 11 and 17 are such that they will be in direct vertical alinement with the said inner edge 22 of the top 6. In other words, a line drawn vertically through the inner side edge 22 of the top 6 will bisect the center of the pivots 11 and 17, when the bucket is in closed position, as indicated by the dot and dash line indicated by the numeral 24 in Fig. 3. Locating the center of the pivots 11 and 17, in direct vertical alinement with the inner or supporting side 22 of the movable section 4, reduces the space 25 under the top 6 with respect to the upper surface of the part 18 of section 5, whereby the bottom of the member 6 will be in close proximity and hug the top of the part 18. This arrangement prevents parts, such as thin washers, or washer-like elements from falling or slipping out between the two surfaces of the sections 4 and 5. Fig. 3 shows the close proximity of the parts 18 and 6 during both opened and closed positions of the section 4.

The section 5 of the bucket 3 is maintained relatively stationary with respect to the hinged part or section 4, and remains in a proper plane with respect to the chains 1 and 2 because pins 21, 21 located on each side of the section 5, also pass through the chains 1 and 2 as well as through the downwardly extending legs or lugs 20, 20. The pins 21, 21 like the pins 11 and 17 are positioned through the rollers 12 adjacent the rollers 12 through which the pins 11 and 17 pass. The bucket part 4 is relatively shiftable with respect to the part 5 inasmuch as there is only one horizontal pivot point (the pins 11 and 17) pivotally connecting the part 4 on each side, while the part 5 is connected at two points to each chain through adjacent rollers 12 by the elongated pins 11, 17 and 21, 21. The pins 11 and 17 pivotally mount the section 4 to the chains 1 and 2, as well as fastening the part 5 at opposite points to the chains 1 and 2.

The pins 11 and 17 are relatively long, being of sufficient length to pass through the spaced legs 20, 20 of the section 5, as well as passing through the spaced legs 7 and 14. Therefore, the pins 11 and 17 perform a dual function. They secure the part 4 pivotally to the chain, pivotally connect the part 4 to the part 5, and connect the part 5 to the chains 1 and 2. The pins 21 pass through the rollers 12 of the chain links and through the lugs 20, 20 to support the part 5 on the chains 1 and 2.

A bar 26 is fixed to the outer surface of the leg 7 of the movable section 4, and extends forwardly as indicated at 27 substantially to the outer edge 28 of the top 18 of the section 5, and perhaps a slight distance therebeyond. A pin 29 is rigidly connected to the forward end of the bar or member 26, as clearly shown in Figs. 1 to 3, the purpose of this pin 29 being to permit the engagement thereof with a stationary cam bar (not shown) on the machine frame. Therefore, during the operation of the chains 1 and 2, the section 4 of a bucket 3 will be engaged by the cam bar to shift the bucket part 4 from the positions shown in Figs. 2 and 3 to their normal holding, clamping or locking positions, as shown in Figs. 1 and 4.

In normal operation when the pin 29 is not engaged by the cam bar, the weight of the bucket section 4 will normally drop downwardly because of its own weight, and cause the section 4 to be in open position, as shown in Figs. 2 and 3, the part 4 being pivoted about the pins 11 and 17. Therefore, the parts 4 and 5 normally will be spaced apart to permit articles to be easily inserted. The inward closing movement of the bucket part 4 is controlled by the cam, and the outward movement of the section 4 is limited by means of the edge 30 of the legs 7 and 14 engaging the underside 31 of the top 18 of the bucket section or part 5, Figs. 2 and 3.

The specific function of the particular conveyer, and its chain driven buckets, is to hold at least one rigid article and its cooperating smaller part or parts for movement to within certain precise limits, and therefore permit the articles to be deposited on the top or surface 18 and then, at, or shortly after, move the part 4 to its closed position. The closing of the bucket part of section 4 is preferably done mechanically when the pin 29 becomes engaged by the stationary cam bar, whereby the part 6 will be caused to be shifted on its axes 11 and 17 to hold the part 4 in closed position. Inasmuch as there is pivotal movement of the section 4 with respect to the section 5, and inasmuch as the tolerances between the parts 6 and 18 is relatively close, the inner upper edge of the top 18 may be slightly beveled, as indicated at 32, Figs. 1 to 4, so as to permit free pivotal movement of the top 6 of the section 4 with respect to the top or shelf part 18 of the section 5.

One end of the section 5 also is provided with a thickened wedge-shaped portion 33 opposite the thickened wedge-shaped portion 16 on the section 4 for assistance in guiding the cartons or containers so as to permit the article or articles to be inserted therein.

The top 18 may be provided with a longitudinally extending channel 34 which extends throughout the entire length of the section 5 to permit proper operation of inserting mechanism to eject the article or articles within the bucket 3 into a carton in which the article or articles are to be contained.

The invention provides a bucket conveyer wherein the buckets are connected in a novel manner. Very close tolerances are provided between the movable section 4 of the bucket with respect to the section 5 so as to permit easy application of the article or articles within the bucket and then hold the articles in position after the movable section 4 has been closed, and thereby overcome any possibility of relatively small, thin articles falling out of the bucket or slipping between the bucket sections 4 and 5.

The predominant feature of the invention lies in the fact that each bucket is normally in open position, that is, the weighted hinged wall section 4 is normally in its open position to permit an article or articles to be easily placed in position. The hinged wall section 4 is pivotally mounted at one side of a bucket, and is capable of infinite adjustability. The inner edge of the section 4 need not be moved to a position where it actually clamps an article, it being merely necessary that the hinged member 4 be shifted by a cam, or other means, to prevent an article from falling out of a bucket, and to maintain the article or articles in proper position to permit easy insertion of the articles in the bucket and to prevent articles from shifting to a position where it would be difficult to push the article out of a bucket into a carton.

The position of the edge 22, as shown, is in straight alinement with the center line of the pins 11 and 17 so as to reduce the space 25. It often happens that the end 22 must be inwardly of the straight line 24, Fig. 3. Therefore the top inner edge of the top 18 may be arcuate, that is, in an arcuate line using the center of the pivot connection 11 and 17 as a center. The straight part, plus the bevel 32, may be arcuately curved to accomplish the same result and particularly so in the case where the article is smaller than shown, so as to cause the side edge 22 to extend farther inwardly. A bucket having a hinged wall, plus an arcuate surface cooperating with a ledge which operates in an arc, and means to provide infinite adjustment of the part 4 with respect to the part 5 comprise the dominating features of the invention.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A bucket conveyer comprising spaced apart continuous roller chains having spaced rollers mounted between laterally spaced links and pins passing through said rollers and links, buckets secured to said chains on opposite sides of the rollers, each of said buckets comprising a first section including an article supporting top and downwardly extending spaced legs integral with said supporting top, first opposed pins of said chains being elongated and pivotally engaging said legs, a second section for said buckets including an overhanging portion overlying a part of the supporting top of the first section, an inner surface of said overhanging portion providing an article clamping surface, downwardly extending legs on said overhanging portion, opposed pins adjacent said first opposed pins being elongated and passing through the legs of both sections to secure the first section at two points at each end to the chains and pivotally connect the second section to the first section and to said chains, and means to move the second section to article engaging position, said last named pins being in vertical alinement with said inner surface of the overhanging portion when said second section is pivoted to a predetermined position.

2. A bucket conveyer comprising spaced apart continuous roller chains having spaced rollers mounted between laterally spaced links, pins passing through said rollers and links, buckets secured to said chains on opposite sides of the rollers, each of said buckets comprising a first section including an article supporting top and downwardly extending spaced legs integral with said supporting top, first opposed pins of said chains being elongated and pivotally engaging said legs, a second section for said buckets including an overhanging portion overlying a part of the supporting top of the first section, an inner edge of said overhanging portion providing an article clamping edge, downwardly extending legs on said overhanging portion, opposed pins adjacent said first opposed pins being elongated and passing through the legs of both sections and said chains to secure the first section at two points at each end to the chains and pivotally connect the second section to the first section, and means to move the second section to closed engaging position, said last named pins being in vertical alignment with said inner edge of the overhanging portion when said second section is moved to closed position, said means to close said second section including a pin on a part of the second section for engagement with a cam member, said supporting top of the first section and the overhanging portion of the second section each having an integral upstanding wedge shaped part at their ends and positioned opposite to each other, said article supporting top of the first section having a longitudinal groove formed in its surface throughout its length.

3. A bucket conveyer comprising spaced apart continuous roller chains having spaced rollers mounted between laterally spaced links, pins passing through said rollers and links, buckets secured to said chains on opposite sides of the rollers, each of said buckets comprising a first section including an article supporting top and downwardly extending spaced legs integral with said supporting top, first opposed pins of said chains being elongated and pivotally engaging said legs, a second section for said buckets including an overhanging portion overlying a part of the supporting top of the first section, an inner edge of said overhanging portion providing an article clamping edge, downwardly extending legs on said overhanging portion, opposed pins adjacent said first opposed pins being elongated and passing through the legs of both sections and said chains to secure the first section at two points at each end to the chains and pivotally connect the second section to the first section, and means to move the second section to closed engaging position, said last named pins being in vertical alinement with said inner edge of the overhanging portion when said second section is moved to closed position, said means to close said second section including a pin on a part of the second section for engagement with a cam member, said supporting top of the first section and the overhanging portion of the second section each having an integral upstanding wedge shaped part at their ends and positioned opposite to each other.

References Cited in the file of this patent

UNITED STATES PATENTS

| | | |
|---|---|---|
| 1,188,747 | Fischer | June 27, 1916 |
| 1,499,822 | Gwinn et al. | July 1, 1924 |
| 2,152,668 | Rundell | Apr. 4, 1939 |
| 2,358,292 | Malhiot | Sept. 12, 1944 |
| 2,755,491 | Terzuoli | June 24, 1956 |